United States Patent
Virbickas et al.

(10) Patent No.: US 12,204,661 B1
(45) Date of Patent: Jan. 21, 2025

(54) SESSION DATA INTEGRITY VERIFICATION

(71) Applicant: Netflow, UAB, Vilnius (LT)

(72) Inventors: Domininkas Virbickas, Vilnius (LT); Kamil Danek, Vilnius (LT); Vakaris Noreika, Vilnius (LT)

( * ) Notice: Subject to any disclaimer, the term of this patent is extended or adjusted under 35 U.S.C. 154(b) by 0 days.

(21) Appl. No.: 18/429,670

(22) Filed: Feb. 1, 2024

(51) Int. Cl.
*G06F 21/60* (2013.01)
*G06F 21/33* (2013.01)
*G06F 21/55* (2013.01)

(52) U.S. Cl.
CPC ............ *G06F 21/606* (2013.01); *G06F 21/33* (2013.01); *G06F 21/554* (2013.01)

(58) Field of Classification Search
CPC ....... G06F 21/606; G06F 21/33; G06F 21/554
See application file for complete search history.

(56) References Cited

U.S. PATENT DOCUMENTS

| | | | | |
|---|---|---|---|---|
| 9,967,236 | B1 * | 5/2018 | Ashley | H04L 63/20 |
| 10,445,514 | B1 * | 10/2019 | Brandwine | G06F 21/6209 |
| 10,574,697 | B1 * | 2/2020 | Mcclintock | H04L 63/1491 |
| 11,068,583 | B2 * | 7/2021 | Edwards | G06F 21/45 |
| 11,288,359 | B1 * | 3/2022 | Caldwell | H04L 63/102 |
| 11,438,378 | B1 * | 9/2022 | Dell'Amico | H04L 9/3236 |
| 11,489,829 | B1 * | 11/2022 | Ulrich | H04L 63/0861 |
| 2015/0254452 | A1 * | 9/2015 | Kohlenberg | G06F 21/45 726/6 |
| 2017/0346797 | A1 * | 11/2017 | Yedidi | H04L 63/14 |
| 2018/0007087 | A1 * | 1/2018 | Grady | G06F 21/554 |
| 2020/0137109 | A1 * | 4/2020 | Endler | H04L 63/1466 |
| 2022/0027498 | A1 * | 1/2022 | Vandanapu | H04L 9/0643 |
| 2023/0082633 | A1 * | 3/2023 | Seletskiy | H04L 63/1425 726/7 |
| 2023/0128082 | A1 * | 4/2023 | Guise, Jr. | H04L 63/123 726/12 |

* cited by examiner

*Primary Examiner* — Darren B Schwartz
(74) *Attorney, Agent, or Firm* — Young Basile Hanlon & MacFarlane, P.C.

(57) ABSTRACT

A validation software obtains a session datum from a request initiating at a device. The validation software hashes the session datum to obtain a hashed session datum. The validation software transmits a validation request that includes a portion of the hashed session datum to a validation server. The portion of the hashed session datum may have a length that is less than a length of the hashed session datum. The validation software determines, and based on a response received from the validation server, that the session datum is likely compromised. In response to determining that the session datum is likely compromised, a notification is output at the device.

20 Claims, 5 Drawing Sheets

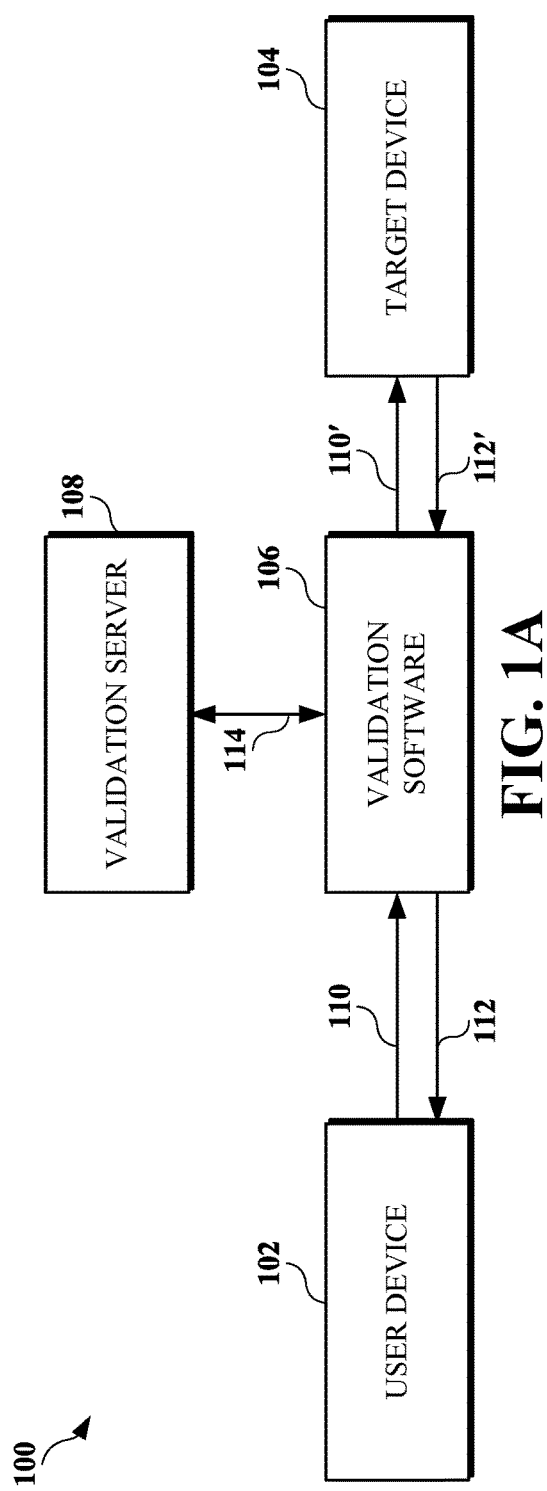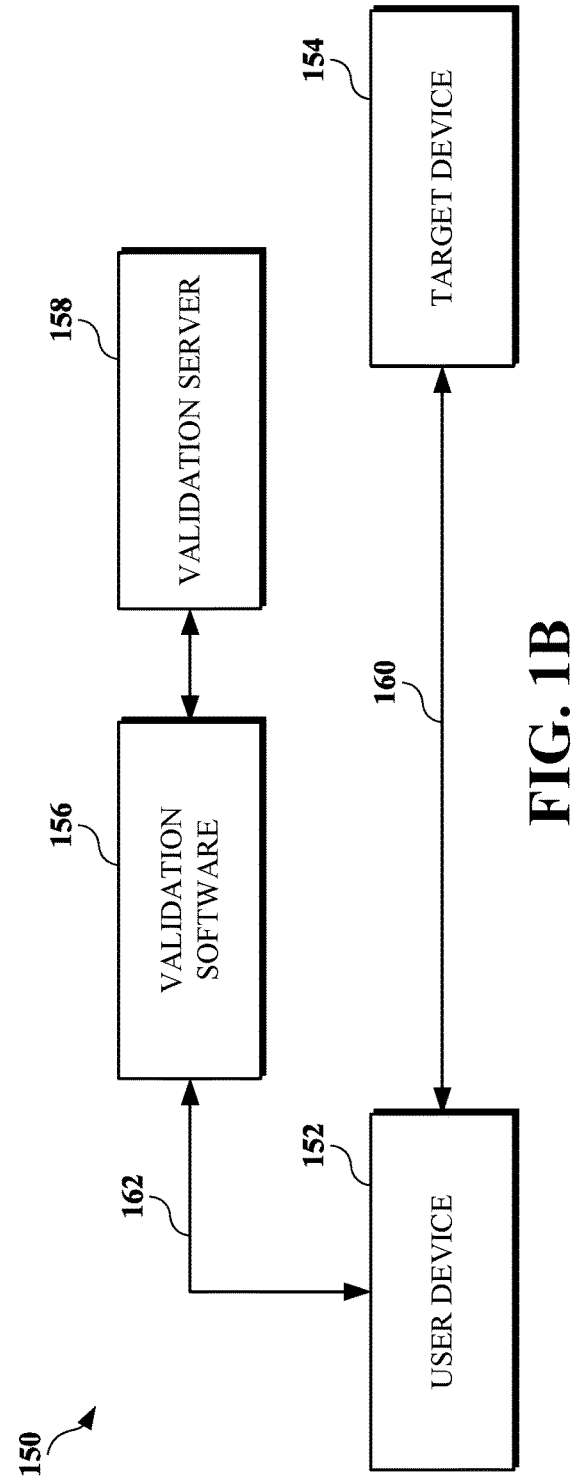

SESSION DATA INTEGRITY VERIFICATION

FIELD

This disclosure relates generally to session hijacking, and, more specifically, to session data integrity verification.

SUMMARY

Disclosed herein are implementations of session data integrity verification.

One general aspect is a method that includes obtaining, by a validation software, a session datum from a request initiating at a device; hashing, by the validation software, the session datum to obtain a hashed session datum; transmitting, by the validation software and to a validation server, a validation request that includes a portion of the hashed session datum; determining, by the validation software and based on a response received from the validation server, that the session datum is likely compromised; and, in response to determining that the session datum is likely compromised, outputting a notification at the device.

One general aspect is a device that includes a memory and a processor. The processor is configured to execute instructions stored in the memory to obtain, by a validation software, a session datum from a request initiating at the device; hash, by the validation software, the session datum to obtain a hashed session datum; transmit, by the validation software and to a validation server, a validation request that includes a portion of the hashed session datum; determine, by the validation software and based on a response received from the validation server, that the session datum is likely compromised; and, in response to determining that the session datum is likely compromised, output a notification at the device.

One general aspect is a non-transitory computer readable medium that stores instructions operable to cause one or more processors to perform operations that include obtaining, by a validation software, a session datum from a request initiating at a device; hashing, by the validation software, the session datum to obtain a hashed session datum; transmitting, by the validation software and to a validation server, a validation request that includes a portion of the hashed session datum; determining, by the validation software and based on a response received from the validation server, that the session datum is likely compromised; and, in response to determining that the session datum is likely compromised, outputting a notification at the device.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the methods and/or techniques disclosed herein. Aspects can be combined such that features described in the context of one aspect may be implemented in another aspect.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 1A is a block diagram of a system where session data integrity verification can be implemented.

FIG. 1B is a block diagram of another system where session data integrity verification can be implemented.

DETAILED DESCRIPTION

Figure 2:
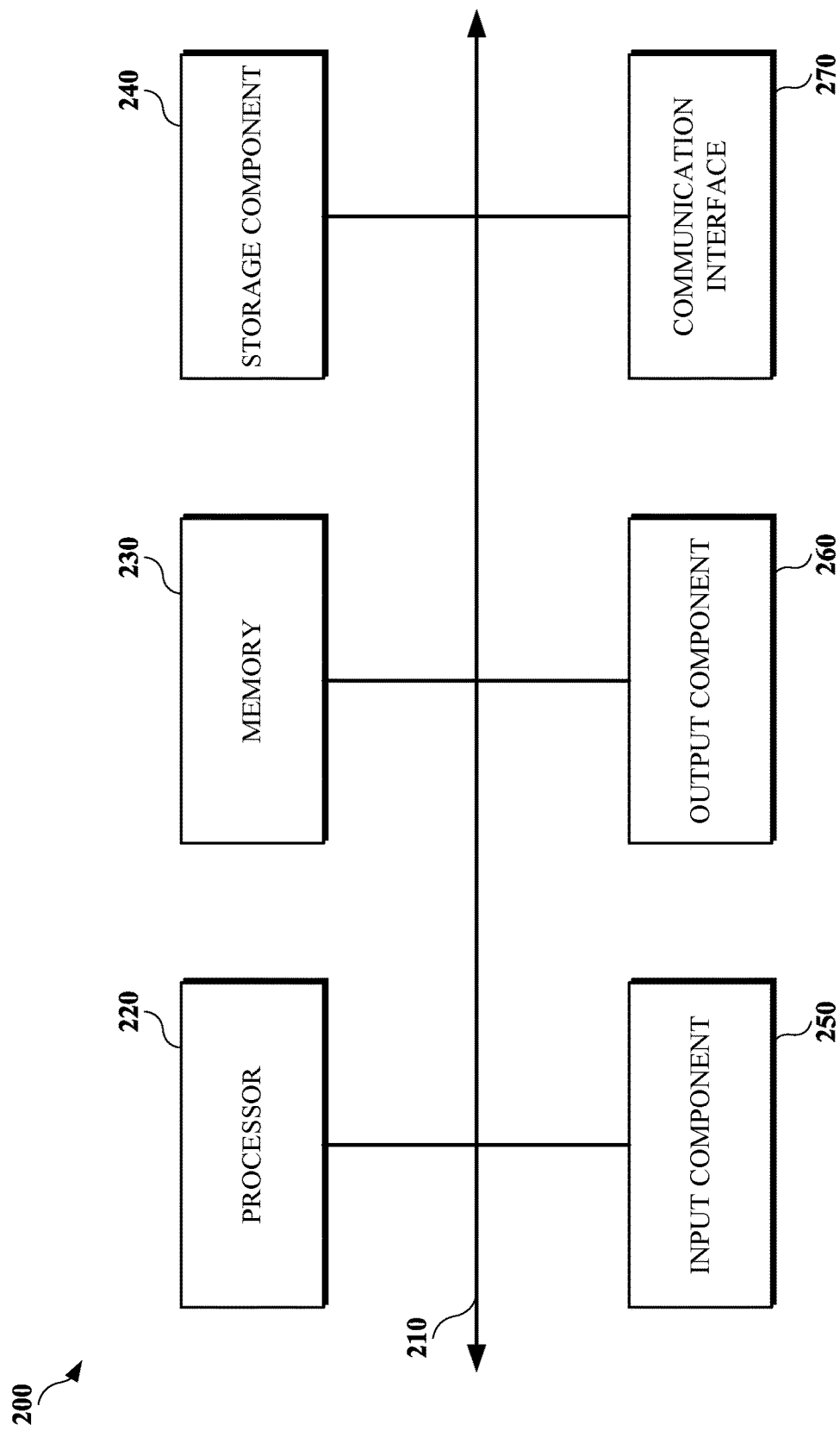
FIG. 2 is a block diagram of an example internal configuration of a computing device of a system where session data integrity verification can be implemented.

In digital communications and cybersecurity, requests from user devices (e.g., client devices) to target devices (e.g., servers) often include data (e.g., session data) usable by the target devices in identifying users. The session data may include cookies, tokens, and other authentication details. The session data can be used to maintain session integrity, offer personalized user experiences, grant access to user accounts, and optimize client-server interactions, among other uses. However, such session data can pose security and privacy risks.

In client-server communications, session data is susceptible to misuse and compromise. Attackers may hijack, intercept, or acquire such data using various techniques, including packet sniffing and cross-site scripting (XSS), among others. Once these session data are obtained, attackers can impersonate legitimate users, gaining unauthorized access to sensitive data and accounts. The server, misled by the validity of the session data, remains unaware of this malicious activity. As a result, the attacker, masquerading as the legitimate user, can execute actions leading to serious security violations, including data theft and unauthorized system access. Furthermore, the illicit market for stolen user identification data is expanding, with such data being traded and sold for harmful purposes. These situations compromise user privacy and heighten security risks, leading to account takeovers, data theft, and financial fraud.

Account takeover occurs even when multi-factor authentication is employed. During an active connection, stored data can be exploited for access to a user's computer or online accounts. Hackers may use session hijacking to control a user's browsing session and access personal information, utilizing the session data stored in browser cookies. Hackers commonly intercept communication between the user and server using packet sniffers, capturing session identifiers (IDs) and sensitive data. Malware deployment is another tactic, granting direct access to the user's computer and active sessions. Session fixation attacks manipulate system vulnerabilities, allowing hackers to set the session ID of the user, often through phishing. For example, an attacker may send a link that includes a specific session ID; upon user login, the attacker gains control of the session. XSS attacks deceive users into running malicious code from seemingly trusted servers, enabling cookie theft.

The vulnerability of session data to such exploitation emphasizes the need for strong security protocols in its management and transmission. While techniques to mitigate account takeover by session hijacking exist, they predominantly focus on server-side precautions, leaving users dependent on the security measures implemented by individual websites. This reliance becomes problematic when websites fail to employ adequate protective technologies, increasing susceptibility to attacks. The situation is exacerbated if a website's session ID or its generation mechanism is compromised, rendering users vulnerable to hijacking. From a user's perspective, the risk of their session being hijacked remains uncertain post-login, casting doubt on the security of data within client-side components like session storage.

Implementations according to this disclosure utilize a validation software (which may be implemented or configured as a transparent proxy) and partial hash comparisons for real-time detection of potentially compromised session data, thereby enhancing security against session hijacking and account takeover threats. The teachings herein implement an additional layer of defense by inspecting session data for known vulnerabilities or leaks, thus significantly mitigating the risks associated with traditional client-server communications. Users can be provided with information about potential vulnerabilities of specific sessions to session-hijacking attacks. By inspecting for session data (e.g., cookies) that may have been leaked, users are afforded an additional layer of defense against session hijacking attacks complementary to any defenses implemented at servers.

In some implementations, a transparent proxy intercepts user device requests, hashes cookies within these requests to obtain hashed cookies, and sends validation requests with portions of these hashed cookies to a validation server. To enhance security, particularly for sensitive information in cookies, such as session identifiers or personal data, a cryptographic hashing algorithm hashes each cookie. Only a portion of a hashed cookie (e.g., the first half) may be sent in an HTTP POST request (or some other type of request) to the validation server. The validation server may return lists of full-length matching hashed cookies, which are hashes of known compromised (e.g., leaked) cookies. Upon finding a match between a hashed cookie and one of the full-length matching hashed cookies, the transparent proxy at least alerts the user to the potential of a session hijacking threat.

While the teachings herein are mainly described with respect to session data that are cookies, the disclosure is not so limited. Session data can be or include session tokens, JavaScript Object Notation (JSON) Web Tokens, Initiative for Open Authentication (OATH) tokens, or any other session data usable by a server to identify a user or a session of a user.

As is known, a cookie is a small piece of data (e.g., a string or some other data structure) stored on a user's computer by a web browser, typically used to remember information about the user's visit to a website, such as login details or site preferences. A JSON Web Token is a compact, Uniform Resource Locator (URL)-safe means of representing claims to be transferred between two parties, where the claims are encoded as a JSON object that is used primarily in authentication processes, such as to verify identity or grant access rights. An OATH token is a secure, portable authentication tool, often in the form of a hardware device or software application, used to generate time-based or event-driven one-time passwords (OTPs) for user verification in multi-factor authentication systems, enhancing security by requiring something the user has in addition to something they know.

FIG. 1A is a block diagram of a system 100 where session data integrity verification can be implemented. The system 100 includes a user device 102 (e.g., an endpoint), a target device 104, a validation software 106, and a validation server 108.

Requests, which can include session data, are transmitted from the user device 102 to the target device 104. Requests may originate from an application executing on the user device 102, which may be a web browser, a dedicated client application, or any other software capable of internet communication. The requests may be directed to, for example, a website implemented by or hosted at the target device 104. The inclusion of session data in the requests can be useful for maintaining the state and security of user sessions, especially in environments where persistent log-ins or transactions are involved. The target device 104 can use the session data to, for example, identify a user initiating a request to the target device 104 and/or to enhance the user experience. The target device 104 can use the session data to maintain session continuity, enabling the target device 104 to recognize returning users and preserve session states, such as login status and user preferences.

In the context of the system 100, an illustrative, but non-limiting example, of including session data in requests is now provided. When a web browser executing at the user device 102 initiates a request to the target device 104, the web browser may retrieve relevant cookies stored in at the user device 102. The cookies can be fetched from a cookie storage area (or cookie repository) of the web browser. This retrieval process may be governed by cookie management policies of the web browser, which may include considerations such as cookie domain, path, expiry, and security attributes. Once the appropriate cookies are identified based on at least some of the cookie management policies, they are included in the HTTP request headers sent to the target device 104.

To illustrate further, consider a scenario where the user device 102 operates a web browser that has previously visited a website hosted by the target device 104. During this visit, the target device 104 sends a session cookie, named "SessionID", and a preference cookie, named "UserTheme", to the web browser. The "SessionID" contains a unique identifier for the current session of the user, while the "UserTheme" stores the user's selected website theme. At least some of these cookies may be stored in the web browser's cookie storage area with specific attributes such as domain (e.g., "acme.com"), path (e.g., "/"), expiration date, if any, among others.

The expiration date can be a fixed expiration date (e.g., 31 Dec. 2023 at 23:59:59 GMT). The expiration date can be a relative expiration date, which causes the cookie to expire after a certain period from the time the cookie was created or last updated. For example, if a cookie is set to expire 30 days after it was last set or updated and the cookie was set on "1 Jan. 2024", then it would expire on "31 Jan. 2024." A cookie might have a long-term expiration date. To illustrate, cookies used for remembering user preferences or tracking user behavior over long periods may have expiration dates set several years in the future. For example, a cookie might be set to expire "5 years from the current date," therewith ensuring long-term preference retention or tracking. Certain cookies may not have expiration dates. For example, session-specific cookies (such as the "SessionID" described herein) may be designed to last only for the duration of the user's session and may be automatically deleted when the web browser is closed. It is noted, however, that even session-specific cookies may outlive the closing of a browser session.

When the user revisits the same website (e.g., "acme.com"), the web browser automatically fetches cookies from its cookie storage area. The browser checks the cookie attributes against the current request parameters. If the domain and path of the upcoming request match those of the cookies, and the cookies have not expired, the browser may include them in HTTP request headers. Specifically, the "Cookie" header in the HTTP request may contain "SessionID=abc123; UserTheme=darkmode", assuming "abc123" is the session identifier and "darkmode" is the selected theme. The target device 104 receives the cookies within the request and uses the "SessionID" to maintain the user's session state and the "UserTheme" to present the website in the user's preferred theme.

A request can include different types of cookies. Session cookies can be used by the target device 104 to maintain user interaction states during a single session, typically (but not necessarily) expiring when the session ends. Persistent cookies can be used to store user information across sessions, typically (but not necessarily) with set expiration dates. Some persistent cookies may include login information, such as a username or user identifier and a password. For example, when a user logs in to a site, the site might create a persistent cookie on the user device of the user containing the login information. The next time the user visits the site, the site can read this cookie to automatically log the user in or to personalize their user experience.

Secure cookies can be used over encrypted connections, and HttpOnly cookies, shielded from client-side scripts, bolster security and guard against script-based attacks, such as XSS. Some cookies may be first-party cookies and others may be third-party cookies. First-party cookies can be used, for example, to enhance user experience through personalization. Third-party cookies can be used for broader purposes, such as cross-site tracking and advertising. Other types of cookies are also possible.

The validation software 106 can intercept requests from the user device 102 to the target device and determine whether session data (e.g., cookies) included in the requests are likely compromised. If the session data in a request (e.g., a request 110) are not likely compromised, the validation software 106 retransmits the request to the target device 104. That is, the validation software 106 transmits another (e.g., new) request (e.g., a request 110') to the target device 104 that includes all data that are included in the request (e.g., the request 110). The response (e.g., a response 112') from the target device 104 can be received by the validation software 106 and transmitted, as a new response (e.g., a response 112) to the user device 102. If the validation software 106 determines that at least one of the cookies is compromised, then the validation software 106 may cause a notification to be displayed at the user device 102 indicating that the cookie is likely compromised. The validation software 106 may work in conjunction with a validation server 108 to determine whether a cookie is likely compromised.

The validation server 108 may be or include data regarding compromised cookies. In an example, the data regarding compromised cookies may be a list of compromised cookies. The list may be stored in a data store, such as a database. In an implementation, known compromised cookies are stored in the list. In an implementation, the validation server 108 may alternatively or additionally include hashed values of the known compromised cookies. As further described herein, the validation software 106 transmits validation requests (e.g., such as a validation request 114) with respect to one or more cookies to the validation server 108. A cookie can be determined to be at least likely compromised based on the response.

In some implementations of the system 100, the validation server 108 may not be used and the list of compromised cookies may also be available at or deployed at the user device 102. However, to optimize resource usage and avoid burdening the user device 102 with the storage of the list and processing demands, it may be preferable to include a separate validation server in the system 100. As such, the validation software 106 may initiate, for example, HTTP POST validation requests (or some other types of validation requests) to the validation server 108. As further described herein, the validation requests can carry (e.g., include) essential data required for querying the list of compromised cookies.

As further described herein, "at least likely compromised" means, in some implementations, that a cookie can be determined to be compromised (if included in the list of compromised cookies); and in other implementations, "at least likely compromised" means that the cookie can only be determined to be likely compromised (as further described herein with respect to hashing).

The validation software 106 can be implemented as (e.g., include or configured as) a transparent proxy. A transparent proxy, as described in this context, operates as an intermediary for requests from the user device 102 seeking resources from the target device 104. The validation software (e.g., the transparent proxy) intercepts all requests to the target device 104 without the knowledge of the requestor at the user device 102, hence the term 'transparent.' This type of proxy can be particularly useful in the context of securing web sessions and preventing account takeover by inspecting and managing web traffic in real-time. When the user device 102 sends a request to the target device 104, the validation software 106 (e.g., the transparent proxy) intercepts the request and can perform various operations such as determining whether cookies included in the request are at least likely compromised before forwarding the request (as a new or another request) to the target device 104. The response from the target device 104 can also be intercepted and may be processed in a similar manner to determine whether a response includes cookies that are at least likely compromised.

While the validation software 106 is depicted in FIG. 1A as being separate from the user device 102 in FIG. 1A, the validation software 106 can be implemented (e.g., deployed) within different devices of the system 100. In an example, the validation software 106 can be deployed in or be part of the user device 102. In an example, the validation software 106 can be deployed in a computing device (e.g., a server) that is separate from the user device 102. In an example, the validation software 106 can be deployed in the validation server 108.

The validation software 106 can operate as a man-in-the-middle (MITM) type of service. A digital certificate can be associated with the validation software 106 and integrated into a trusted certificate database of the user device 102. The certificate can be self-signed (such as by the provider of the validation software 106) or signed by a trusted (e.g., recognized) third-party Certificate Authority (CA). This certificate enables the transparent proxy (i.e., the validation software 106) to seamlessly intercept web traffic, handling all requests made by the browser to the target device 104 on behalf of the user device 102, without disrupting the user's ongoing session or requiring their awareness.

In an example of the interception process, the validation software 106 may establish a secure session (such as using Transport Layer Security (TLS), Secure Socket Layer (SSL), or some other secure protocol) with the requester (e.g., a web browser) of the user device 102 using, for example, the self-signed certificate, therewith masquerading as the target device 104. The secure session creates a secure channel between the user device 102 and the validation software 106. Simultaneously, the validation software 106 initiates a separate secure session with the target device 104, relaying the requests from the requester. The dual secure session setup enables the validation software 106 to securely inspect cookies, while preserving the privacy and integrity of the communication, as further described herein. By implementing the validation software 106 at the user device 102, cookies are checked before they leave the user device 102.

FIG. 1B is a block diagram of a system 150 where session data integrity verification can be implemented. The system 150 includes a user device 152 (which can be similar to the user device 102 of FIG. 1A), a target device 154 (which can be similar to the target device 104 of FIG. 1A), a validation software 156, and a validation server 158 (which can be similar to the validation server 108 of FIG. 1A). The validation software 156 can be implemented in the user device 152, the validation server 158, or some other device.

As described above, a requester (e.g., a web browser) executing at the user device 152 transmits requests to the target device 154. Whereas the validation software 106 of FIG. 1A acts as a transparent proxy and intercepts requests from the user device 102, the validation software 156 receives validation requests from the user device 152. That is, prior to transmitting a request 160 to the target device 154, the requester of the user device 152 can itself transmit a request for validation 162 to the validation software 156, which works in conjunction with the validation server 158, as described above with respect to FIG. 1A to respond to the validation request 114. The request for validation 162 includes session data (e.g., cookies) that are to be transmitted from the user device 152 to the target device 154 in the request 160.

If some of the session data (e.g., cookies) are determined to be at least likely compromised, then the user device 152 may take an appropriate action. The appropriate action may be to not transmit the request 160 to the target device 154. The appropriate action may be to remove the session data that is determined to be at least likely compromised from the request 160. The appropriate action may be to display a notification at the display of the user device 152 prompting the user to provide input regarding the handling of the session data that is likely compromised.

FIG. 2 is a block diagram of an example internal configuration of a computing device 200 of a system where session data integrity verification can be implemented. In one configuration, the computing device 200 may form part of or implement the systems, servers, environments, infrastructures, components, devices, or the like described elsewhere herein. The computing device 200 may implement one or more of the user device 102, the target device 104, the validation server 108, a computing device that implements the validation software 106 of the system 100 shown in FIG. 1A. The computing device 200 may implement one or more of the user device 152, the target device 154, the validation server 158, a computing device that implements the validation software 156 of the system 150 shown in FIG. 1B.

The computing device 200 may include a universal bus 210 communicatively coupling a processor 220, a memory 230, a storage component 240, an input component 250, an output component 260, and a communication interface 270.

The universal bus 210 may include a component that enables communication among multiple components of the computing device 200. The processor 220 may be implemented in hardware, firmware, and/or a combination of hardware and software. The processor 220 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), another type of processing component, or a combination thereof. In some aspects, the processor 220 may include one or more processors capable of being programmed to perform a function. The memory 230 may include a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 may store information and/or software related to the operation and use of a computing device 200. For example, the storage component 240 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

The input component 250 may include a component that permits the computing device 200 to receive information, such as via user input (e.g., a touch screen display, a keyboard, a keypad, a mouse, a button, a switch, and/or a microphone). Additionally, or alternatively, the input component 250 may include a component for determining location (e.g., a global positioning system (GPS) component) and/or a sensor (e.g., an accelerometer, a gyroscope, an actuator, another type of positional or environmental sensor, and/or the like). The output component 260 may include a component that provides output information from the computing device 200 (via, for example, a display, a speaker, a haptic feedback component, an audio or visual indicator, and/or the like).

The communication interface 270 may include a transceiver-like component (e.g., a transceiver, a separate receiver, a separate transmitter, and/or the like) that enables the computing device 200 to communicate with other devices, such as via a wired connection, a wireless connection, or a combination of wired and wireless connections. The communication interface 270 may permit the computing device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, and/or the like.

The computing device 200 may perform one or more processes, techniques, flows, actions, or the like (collectively, techniques) described elsewhere herein. The computing device 200 may perform these techniques based on the processor 220 executing software instructions stored by a non-transitory computer-readable medium, such as the memory 230 and/or the storage component 240. As used herein, the term "computer-readable medium" may refer to a non-transitory memory device. A memory device may include memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more techniques described elsewhere herein. Additionally, or alternatively, hardware circuitry may be used in place of or in combination with software instructions to perform one or more techniques described elsewhere herein. Thus, implementations described herein are not limited to any specific combination of hardware circuitry and software.

The quantity and arrangement of components shown in FIG. 2 are provided as an example. In practice, the computing device 200 may include additional components, fewer components, different components, or differently arranged components than those shown in FIG. 2. Additionally, or alternatively, a set of components (e.g., one or more components) of the computing device 200 may perform one or more functions described as being performed by another set of components of the computing device 200.

As indicated above, FIG. 2 is provided as an example. Other examples may differ from what is described with regard to FIG. 2.

Figure 3:
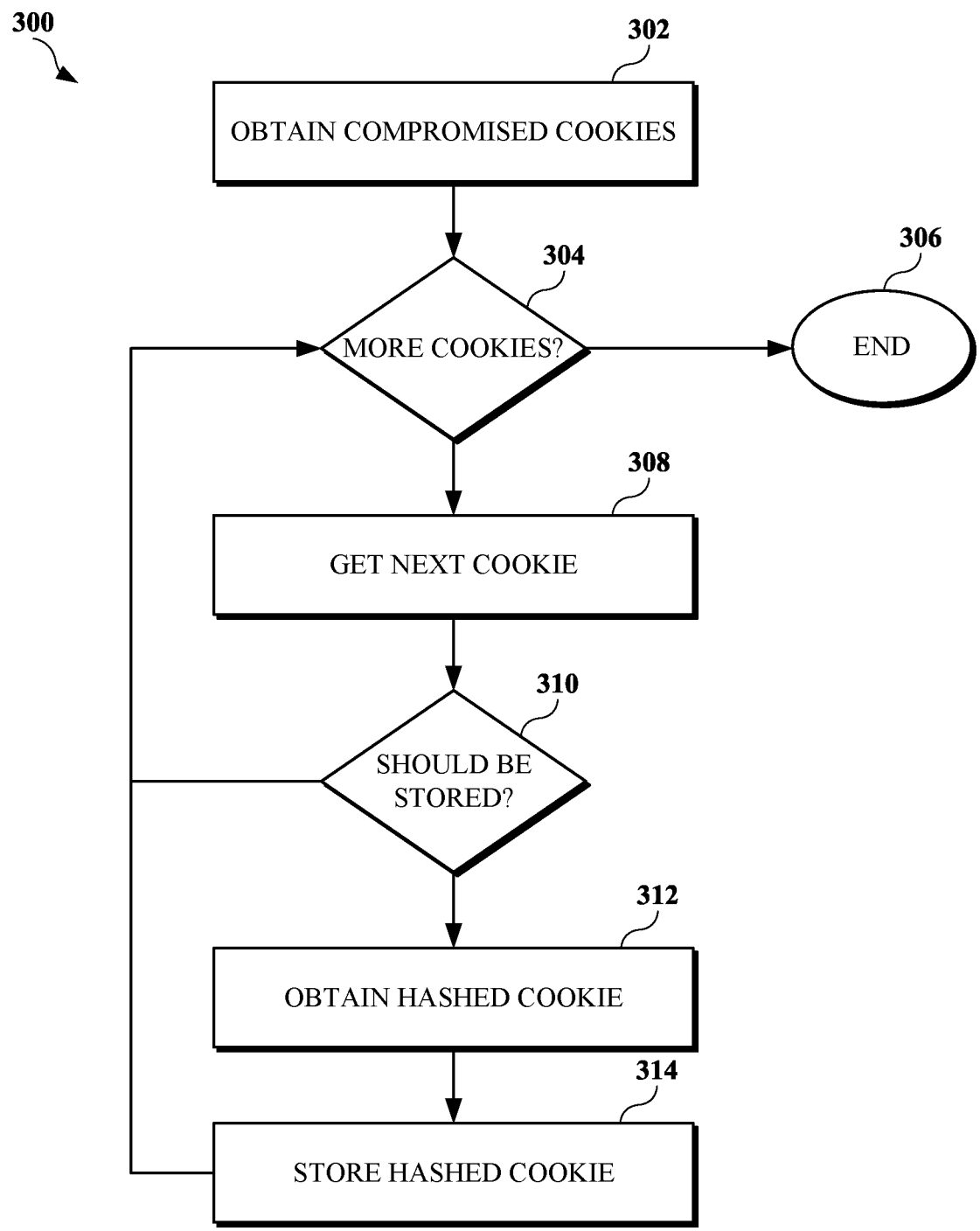
FIG. 3 is a flowchart of a technique for populating and maintaining a list of compromised cookies.

FIG. 3 is a flowchart of a technique 300 for populating and maintaining a list of compromised cookies. The technique 300 can be implemented by a validation server, such as the validation server 108 of FIG. 1A or the validation server 158 of FIG. 1B. The technique 300 can be implemented, for example, as a software program that may be executed by a computing device such as the computing device 200 of FIG. 2. The software program can include machine-readable instructions that may be stored in a memory such as the memory 230 of FIG. 2, and that, when executed by a processor, such as the processor 220 of FIG. 2, may cause the computing device to perform the technique 300. The technique 300 can be implemented using specialized hardware or firmware. Multiple computing devices, processors, memories, or a combination thereof may be used.

It is noted that the list of compromised cookies may in fact be more than one list. For example, the list may include a first list of compromised session cookies and a second list of compromised persistent cookies (e.g., a second list of compromised session cookies).

At 302, compromised cookies are obtained. The compromised cookies may be obtained in any number of ways. At least some of the compromised cookies may be obtained from one or more third-party sources or repositories (e.g., a public repository of leaked cookies or login information) that house (e.g., store) at least some of the compromised cookies. At least some of the compromised cookies may be obtained via web scraping (e.g., using automated scripts or programs to extract data from websites). Each of the compromised cookies is examined to determine whether it should be included in the list of compromised cookies.

The technique 300 may perform 308-314 with respect to each of the obtained cookies. As such, at 304, the technique 300 determines whether there are additional cookies to process. If so, the technique 300 proceeds to 308; otherwise, the technique 300 terminates at 306.

At 308, the next cookie is selected (e.g., fetched) from the obtained compromised cookies. At 310, it is determined whether the cookie should be stored in the list of compromised cookies. If the cookie is expired, then the cookie will not be added to the list of compromised cookies and the technique 300 proceeds back to 304. An expired cookie may also be discarded. If the cookie is not expired, the technique 300 may determine whether the cookie is a session cookie or a persistent cookie. In an example, all non-expired persistent cookies are added to the list of compromised cookies. In another example, only persistent cookies that include authentication (e.g., log in) information are added to the list of compromised cookies.

In an example, the cookies themselves are added to the list of compromised cookies. In another example, hashed values of the cookies (i.e., "hashed cookies") are, alternatively or additionally, added to the list of compromised cookies. As such, at 312, a hashed cookie is obtained for the cookie. Any hashing technique or algorithm can be used. In an example, the Secure Hash Algorithm 256-bit (SHA-256) algorithm can be used. At 314, the hashed cookie is stored in the list of compromised cookies. The technique 300 then proceeds back to 304 to process the next cookie, if any.

While not specifically shown in FIG. 3, the technique 300 may be performed on a regular basis. Additionally, the list of compromised cookies may be regularly maintained so as to remove cookies that expired since they were added to the list of compromised cookies.

Figure 4:
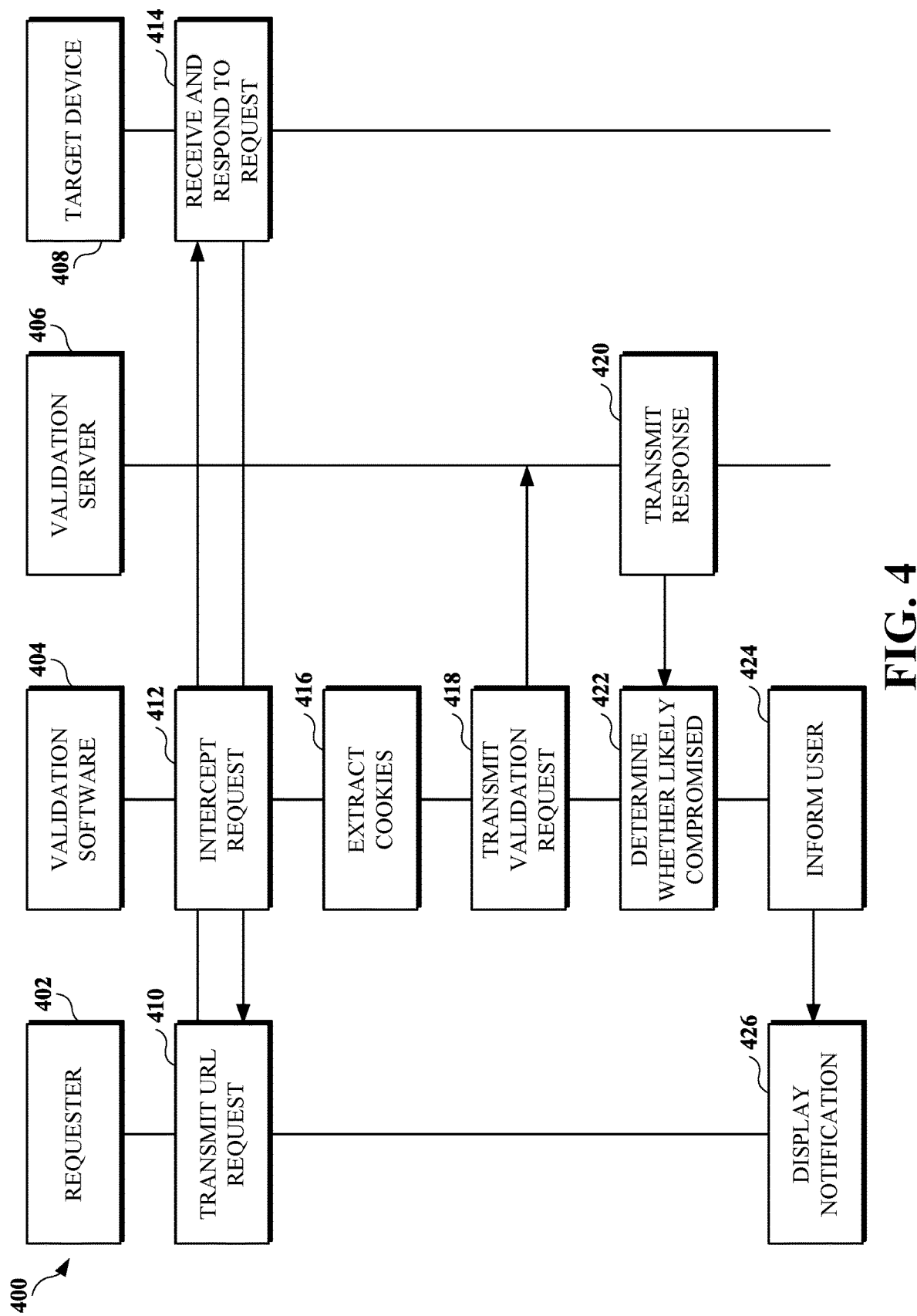
FIG. 4 is an interaction diagram of session data integrity verification.

FIG. 4 is an interaction diagram 400 of session data integrity verification. The interaction diagram 400 includes a requester 402, validation software 404, a validation server 406, and a target device 408. In an example, both the requester 402 and the validation software 404 may be executed or implemented by an endpoint (e.g., the user device 102 of FIG. 1A or the user device 152 of FIG. 1B). The requester 402 can be an application (e.g., a web browser) that transmits requests (e.g., HTTP requests) to the target device 408. In an example, the validation software may be or implement a transparent proxy.

At 410, the requester 402 transmits a request to the target device 408. For example, a user of the requester 402 may enter a URL address or click on a hyperlink on a web page. In response to the user action, the requester 402 formulates a URL request (e.g., the request) for transmission to the target device 408. At 412, the validation software 404 intercepts the request. As described herein, the validation software 404 transmits requests to the target device 408 on behalf of the requester 402. At 414, the target device 408 receives and handles the requests and transmits responses back to the requestor (e.g., the validation software 404). The validation software 404 receives the responses from the target device 408 and transmits the responses to the requester 402.

In an example, the validation software 404 may not transmit the request to the target device 408 until after cookies in the request are confirmed not to be at least likely compromised. In another example, the validation software 404 may continue with the transmission of the request to the target device 408 while continuing to 416 (i.e., while determining whether cookies in the request are at least likely compromised). In an example, the validation software 404 validates the cookies in at least some (e.g., all) requests transmitted from the requester 402 to the same destination (e.g., same recipient at the target device 408). In another example, the validation software 404 only validates the cookies in one (e.g., the very first) request transmitted from the requester 402 to the target device 408. In an example, the validation software 404 can keep track of cookies checked (e.g., validated) in requests to the target device 408 during a session and only validates cookies not already validated in that session. For example, additional or other cookies may be used in subsequent requests.

At 416, the validation software 404 extracts the cookies from the request. As mentioned above, certain of the cookies may be session cookies and others may be persistent cookies. As expiration dates may be associated with some of the cookies, the validation software 404 excludes from validation those cookies that are already expired. In an example, the validation software 404 may be configured to filter (e.g., not extract) cookies (e.g., session cookies) that meet configuration criteria, such as expiration criteria. The configuration criteria may be set by a user associated with the validation software 404. For example, the validation software 404 may be configured to not extract cookies based on their expiration time as set by security preferences of the user. To illustrate, the user can select a desired level of security, for example, opting to cause the validation software 404 to extract only those cookies that will not expire within a user-defined time window, such as the next 1, 5, 10, 30, 60 minutes, or other specified intervals.

At 418, the validation software 404 transmits one or more validation requests to the validation server 406 with respect to the cookies. In an example, one validation request is transmitted for all the cookies. At 420, the validation server transmits a response to the validation request.

In an example, the cookies themselves are transmitted in the validation request. As such, the validation server 406 can check whether a list of compromised cookies maintained by the validation server 406 includes any of the cookies. If the list includes a cookie included in the validation request, the response would indicate that the cookie is compromised; and if the list does not include the cookie, then the response would indicate that the cookie is not compromised. At such, at 422, the validation software 404 determines from the response which specific cookies, if any, are compromised. To illustrate, given the cookie "abc123xyz," the response may essentially state "abc123xyz: compromised" or "abc123xyz: not compromised."

In an example, portions of the cookies are transmitted in the validation request. To illustrate, and without limitations, if a cookie is N characters long, then the portion of the cookie can be the first M characters, where M (e.g., 2048) can be substantially smaller than N (e.g., 4096). For a portion of a cookie included in the validation request, the validation server 406 returns matching cookies from its list of cookies. At 422, the validation software 404 can match a full cookie returned by the validation server 406 in association with the portion, if any, to the cookie to determine whether the cookie is compromised. To illustrate, given the cookie "abc123xyz," the validation request may include the portion "abc123" and the response may include the matching cookies "abc123xyz," "abc123opq," and "abc123xeiunff6." As such, the validation software 404 can determine that the cookie "abc123xyz" is compromised.

In an example, portions of hashed cookies are transmitted in the validation request. Specifically, if a cookie is hashed into a string of P characters, then the transmitted portion could be a segment of the first Q characters, where Q (e.g., 128) can be significantly smaller than P (e.g., 256). The same hashing function that is described with respect to FIG. 3 is used. As such, in an example, the SHA-256 algorithm can be used. This approach enhances security by not transmitting the full hash or the cookies themselves, thus reducing exposure risk. For a portion of a hashed cookie included in the validation request, the validation server 406 identifies any matching hashed cookies from its list. At 422, the validation software 404 then compares the full hash of the original cookie against the partial matches returned by the validation software 404 to determine whether the cookie is likely compromised.

The determination that a cookie is 'likely' compromised is influenced by at least two key factors related to hashing functions. Firstly, the irreversibility of the hashing function, such as SHA-256, means that it is not feasible to reverse-engineer the original cookie from its hash. This irreversibility prevents definitive confirmation of the cookie's compromise solely based on the hash. Secondly, while highly unlikely, the theoretical possibility of hash collisions—where different inputs produce the same hash value—introduces a small margin of uncertainty. Therefore, even when a cookie's hash matches a known compromised hash, the impossibility of reconstructing the original input and the slim chance of hash collisions means the cookie can only be considered 'likely' compromised.

If no cookies are determined to be at least likely compromised, the interaction diagram 400 terminates (not shown). On the other hand, at 424, if a cookie is determined to be at least likely compromised, the validation software 404 causes a notification to be displayed at the user device where the requester 402 is executing. As such, at 426, the notification is displayed at the user device.

If a session cookie is determined to be at least likely compromised, the notification can instruct the user to close all browser tabs and browsers so that the session with the target device 408 (actually, the session between the requester 402 and the validation software 404 and the session between the validation software 404 and the target device 408) is terminated and the session cookie is no longer valid. The user can also be instructed to scan their system for any malware or the like that may be stealing user information. The user may also be instructed to use a secure connection, such as a Virtual Private Network connection.

If a persistent cookie with matched login information is determined to be at least likely compromised, the notification can instruct the user not only to close all web browser tabs and browsers, but also to logout of their devices, change their password, and scan their device(s) any malware or the like that may be stealing user information. In an example, the notification may also instruct the user to delete the at least likely compromised browser cookies. In an example, the notification may prompt the user to confirm the deletion of these cookies, and upon receiving affirmative consent, the at least likely compromised cookies are automatically removed. The user can also be instructed to log off the application (e.g., the website) executing at the target device 408 and/or to change the password they use with that application. The user may also be instructed to use a secure connection, such as a Virtual Private Network connection.

In an example, the notification can enable the user to provide input usable by the validation software 404. In an example, the input may direct the validation software 404 to remove such cookies when transmitting requests to the target device 408. In an example, the input may direct the validation software to continue transmitting the requests to the target device 408 notwithstanding the notification.

Figure 5:
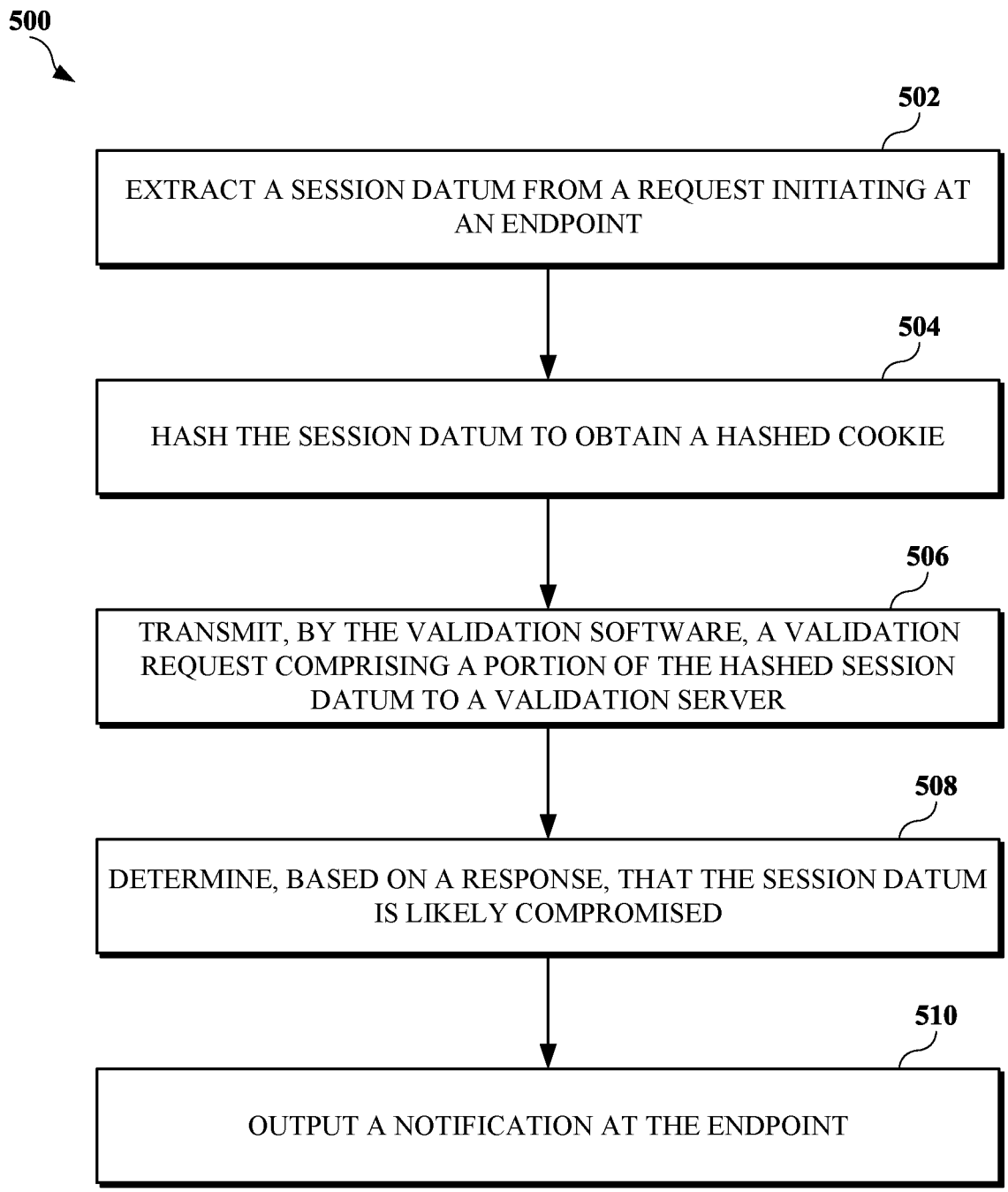
FIG. 5 is a flowchart of an example of a technique for identifying at least likely compromised cookies in requests.

To further describe some implementations in greater detail, reference is next made to examples of techniques which may be performed by or using a system for session data integrity verification. FIG. 5 is a flowchart of an example of a technique 500 for identifying at least likely compromised session data, such as cookies, in requests. The technique 500 can be executed using computing devices, such as the systems, hardware, and software described with respect to FIGS. 1-4. The technique 500 can be performed, for example, by executing a machine-readable program or other computer-executable instructions, such as routines, instructions, programs, or other code. The steps, or operations, of the technique 500, or another technique, method, process, or algorithm described in connection with the implementations disclosed herein can be implemented directly in hardware, firmware, software executed by hardware, circuitry, or a combination thereof. Multiple processors, memories, or both may be used. The technique 500 can be implemented by a validation software, such as the validation software 106 of FIG. 1A or the validation software 404 of FIG. 4.

For simplicity of explanation, the technique 500 is depicted and described herein as a series of steps or operations. However, the steps or operations of the technique 500 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 502, the validation software obtains (e.g., extracts) a session datum included in a request initiating at a device (e.g., an endpoint). The session datum can be a cookie. The device can be a user device such as those described herein. The validation software may be implemented at the device as a transparent proxy. As such, a self-signed certificate can be associated with the transparent proxy in a trusted certificate store of the device. At 504, the validation software hashes the session datum to obtain a hashed session datum. At 506, the validation software transmits a validation request that includes a portion of the hashed session datum to a validation server. As mentioned above, the portion of the hashed session datum has a length that may be less than a length of the hashed session datum. In an example, the portion can be the whole of the hashed session datum.

At 508, the validation software determines that the session datum is likely compromised based on the response received from the validation server. As described above, the response can include a list of full-length hashes that match the portion of the hashed session datum. If the hashed session datum matches any of the full-length hashes, then the validation software determines that the session datum is likely compromised.

At 510, a notification is output at the device (e.g., an endpoint). The notification can be output or caused to be output by the validation software. The notification is readable by a user of the device. The notification can indicate that the session datum is likely compromised. The notification can include a first option indicating to transmit the request and a second option indicating not to transmit the request. As such, the validation software may receive a user input indicating a selection of the first option or the second option. The validation software determines whether to transmit the request (to a target device) based on the user input.

In an example, if the session datum is determined to be likely compromised, the validation software may formulate another request (e.g., a new request) that excludes (i.e., does not include) the session datum and transmits the new request to the target device. In an example, the validation software extracts another session datum from the request and determines whether to validate the other session datums (e.g., whether to include the other session datum in the validation request) based on whether the other session datum was already validated in the current session between the device and the target device. That is, validating the other session datum can be omitted if the other session datum was already validated during the session.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component," "device," or "endpoint" is intended to be broadly construed as hardware, firmware, or a combination of hardware and software. As used herein, a processor is implemented in hardware, firmware, or a combination of hardware and software.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
intercepting, by a validation software implemented as a transparent proxy, a web request initiating at a device and directed to a target;
extracting, by the validation software, a session datum from the web request;
hashing, by the validation software, the session datum to obtain a hashed session datum;
transmitting, by the validation software and to a validation server, a validation request comprising a portion of the hashed session datum that is less than all of the hashed session datum;
determining, by the validation software and based on a response received from the validation server, that the session datum is likely compromised; and
in response to determining that the session datum is likely compromised, outputting a notification at the device.

2. The method of claim 1,
wherein the response received from the validation server comprises a list of full-length hashes that match the portion of the hashed session datum, and
wherein determining, by the validation software and based on a response received from the validation server, that the session datum is likely compromised, comprises:
determining that the hashed session datum matches one of the full-length hashes.

3. The method of claim 1, wherein the notification indicates that the session datum is likely compromised.

4. The method of claim 1, wherein the notification comprises a first option indicating to transmit the web request and a second option indicating not to transmit the web request, the method further comprising:
receiving a user input indicating a selection of the first option or the second option; and
determining whether to transmit the web request based on the user input.

5. The method of claim 1, wherein in response to determining that the session datum is likely compromised the method further comprises:
formulating another web request based on the web request, wherein the another web request excludes the session datum.

6. The method of claim 1, further comprising:
extracting another session datum from the web request; and
omitting validating the another session datum in response to determining that the another session datum is previously validated.

7. The method of claim 1, wherein the validation software is configured as a transparent proxy and is deployed at the device.

8. The method of claim 7, wherein a self-signed certificate is associated with the transparent proxy in a trusted certificate store of the device.

9. A device, comprising:
a memory, wherein the memory is non-transitory; and
a processor, the processor configured to execute instructions stored in the memory to:
intercept, by a validation software implemented as a transparent proxy, a web request initiating at the device and directed to a target;
extract, by the validation software, a session datum from the web request;
hash, by the validation software, the session datum to obtain a hashed session datum;
transmit, by the validation software and to a validation server, a validation request comprising a portion of the hashed session datum that is less than all of the hashed session datum;
determine, by the validation software and based on a response received from the validation server, that the session datum is likely compromised; and
in response to determining that the session datum is likely compromised, output a notification at the device.

10. The device of claim 9,
wherein the response received from the validation server comprises a list of full-length hashes that match the portion of the hashed session datum, and
wherein to determine, by the validation software and based on a response received from the validation server, that the session datum is likely compromised, comprises to:
determine that the hashed session datum matches one of the full-length hashes.

11. The device of claim 9, wherein the notification indicates that the session datum is likely compromised.

12. The device of claim 9, wherein the processor is further configured to execute instructions stored in the memory to:
transmit the web request in response to receiving, subsequent to outputting the notification, user input data indicating a request to transmit the web request.

13. The device of claim 9, wherein in response to determining that the session datum is likely compromised, the processor is further configured to execute instructions stored in the memory to:
formulate another web request based on the web request, wherein the another web request excludes the session datum.

14. The device of claim 9, wherein the processor is further configured to execute instructions stored in the memory to:
extract another session datum from the web request; and
omit validating the another session datum in response to determining that the another session datum is previously validated.

15. The device of claim 9, wherein the validation software is configured as a transparent proxy and is deployed at the device.

16. The device of claim 15, wherein a self-signed certificate is associated with the transparent proxy in a trusted certificate store of the device.

17. A non-transitory computer readable medium storing instructions operable to cause one or more processors to perform operations comprising:
intercepting, by a validation software implemented as a transparent proxy, a web request initiating at a device and directed to a target;
extracting, by the validation software, a session datum from the web request;
hashing, by the validation software, the session datum to obtain a hashed session datum;
transmitting, by the validation software and to a validation server, a validation request comprising a portion of the hashed session datum that is less than all of the hashed session datum;
determining, by the validation software and based on a response received from the validation server, that the session datum is likely compromised; and in response to determining that the session datum is likely compromised, outputting a notification at the device.

18. The non-transitory computer readable medium of claim 17,
wherein the response received from the validation server comprises a list of full-length hashes that match the portion of the hashed session datum, and
wherein determining, by the validation software and based on a response received from the validation server, that the session datum is likely compromised, comprises:
determining that the hashed session datum matches one of the full-length hashes.

19. The non-transitory computer readable medium of claim 17, wherein the validation software is configured as a transparent proxy and is deployed at the device.

20. The non-transitory computer readable medium of claim 19, wherein a self-signed certificate is associated with the transparent proxy in a trusted certificate store of the device.

* * * * *